US012713467B2

(12) United States Patent
Shen et al.

(10) Patent No.: US 12,713,467 B2
(45) Date of Patent: Aug. 18, 2026

(54) CONTENTION-FREE RANDOM ACCESS RESOURCE INDICATION METHOD AND DEVICE

(71) Applicant: CHINA ACADEMY OF INFORMATION AND COMMUNICATIONS, Beijing (CN)

(72) Inventors: Xia Shen, Beijing (CN); Ying Du, Beijing (CN); Zhiyu Yan, Beijing (CN); Huiying Jiao, Beijing (CN); Xiaofeng Liu, Beijing (CN); Guiming Wei, Beijing (CN); Fei Xu, Beijing (CN); Zhiqin Wang, Beijing (CN)

(73) Assignee: CHINA ACADEMY OF INFORMATION AND COMMUNICATIONS, Beijing (CN)

( * ) Notice: Subject to any disclaimer, the term of this patent is extended or adjusted under 35 U.S.C. 154(b) by 542 days.

(21) Appl. No.: 18/128,207

(22) Filed: Mar. 29, 2023

(65) Prior Publication Data

US 2023/0247675 A1 Aug. 3, 2023

Related U.S. Application Data

(63) Continuation of application No. PCT/CN2021/120611, filed on Sep. 26, 2021.

(30) Foreign Application Priority Data

Sep. 30, 2020 (CN) ........................ 202011068929.X

(51) Int. Cl.
*H04W 74/0838* (2024.01)

(52) U.S. Cl.
CPC ............................... *H04W 74/0838* (2024.01)

(58) Field of Classification Search
CPC ........... H04W 74/0838; H04W 74/006; H04W 74/0833
See application file for complete search history.

(56) References Cited

U.S. PATENT DOCUMENTS 11,553,529 B2 1/2023 Xiong et al.
11,653,366 B2 * 5/2023 Rastegardoost ...... H04W 72/23 370/330

(Continued)

FOREIGN PATENT DOCUMENTS

CN 107466101 12/2017
CN 110351877 10/2019
CN 112188638 1/2021

OTHER PUBLICATIONS

CMCC "Discussion on timing relationship enhancements for NTN", 3GPP R1-2006210, Aug. 17-28, 2020 (Year: 2020).*

(Continued)

*Primary Examiner* — Chuong M Nguyen
(74) *Attorney, Agent, or Firm* — NZ Carr Law Office

(57) ABSTRACT

The application discloses a contention-free random access resource indication method, including the following steps: determining, from a random access triggering time, a time different from the random access triggering time by a first interval as a first time, and selecting an RO to carry a preamble at and after the first time, wherein the first interval is a time offset corresponding to a first time offset, the random access triggering time is a time when DCI triggers a random access procedure, and a preamble ID is indicated in DCI. The application further includes a device applying the method. The application solves the problem in an existing method of inadequate preparation time for preamble transmission, and is particularly suitable for a RACH technology of a mobile communication system.

15 Claims, 5 Drawing Sheets

(56) References Cited

U.S. PATENT DOCUMENTS

| | | | | |
|---|---|---|---|---|
| 2020/0245367 | A1* | 7/2020 | Sun | H04W 74/006 |
| 2020/0296635 | A1* | 9/2020 | Rastegardoost | H04L 5/0048 |
| 2022/0217790 | A1* | 7/2022 | Qiu | H04W 56/005 |

OTHER PUBLICATIONS

Ericsson "Feature lead summary on timing relationship enhancements", 3GPP R1-200xxxx, Aug. 17-28, 2020 (Year: 2020).*

The international search report of the corresponding PCT Application No. PCT/CN2021/120611 issued on Dec. 2, 2021 along with English translation thereof.

E Ericsson: "3GPP TSG-RAN WG1 Meeting #102-e Source: Moderator (Ericsson) Title: Feature lead summary on timing relationship enhancements Document for: Discussion", Agenda Item, Jan. 1, 2020 (Jan. 1, 2020), XP055743390, Retrieved from the Internet: URL:https://www.3gpp.org/ftp/tsg_ran/WG1_RL1/TSGR1_102-e/Inbox/drafts/8.4.1/ R1-200xxxx%20FL%20summary%20on%20NTN%20timing%20relationships 20_V024_Moderator_Moderator_V020_FraunhoferlIS_FraunhoferHHI_Apple_Sony.docx.

EESR of the corresponding EP Patent Application No. 21874373.0 dated Oct. 8, 2024.

* cited by examiner

Receive DCI triggering random access
Time offset
Terminal
An RO corresponding to DCI indication
RO

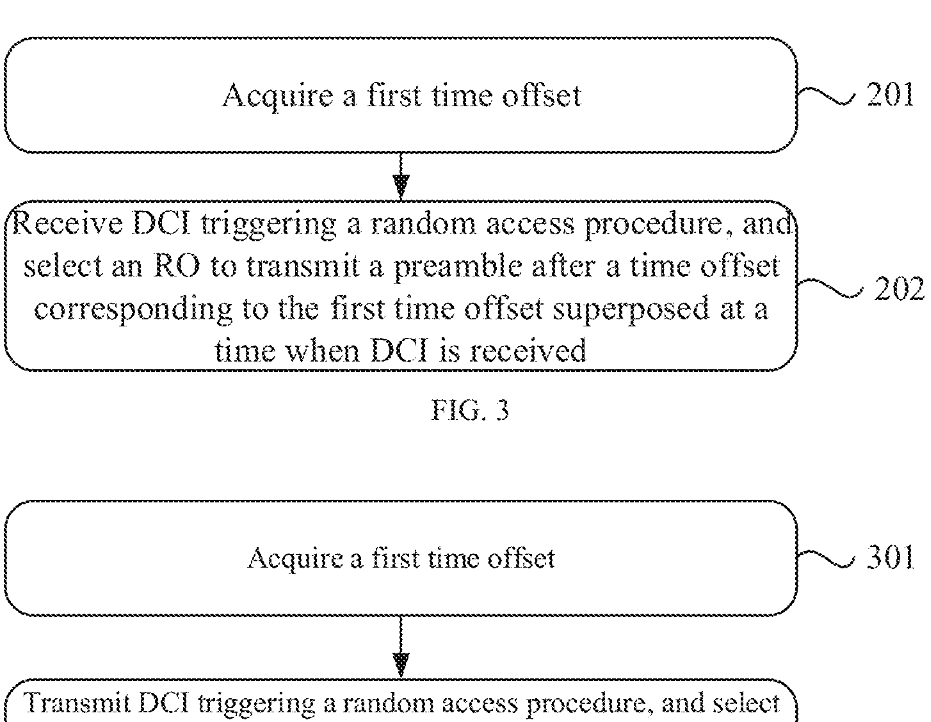
FIG. 3
Acquire a first time offset
301
Transmit DCI triggering a random access procedure, and select an RO corresponding to an indication to receive and detect a preamble after a time offset corresponding to the first time offset superposed at the time when DCI is received
302
FIG. 4
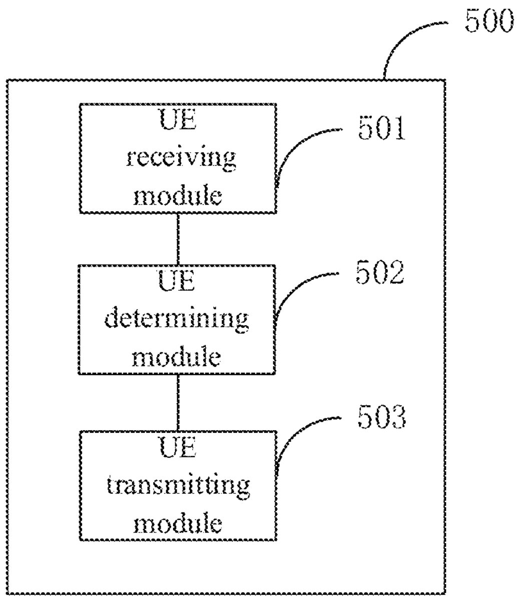
FIG. 5

700
701
702
703
Memory
Processor
Wireless interface
Network device

CONTENTION-FREE RANDOM ACCESS RESOURCE INDICATION METHOD AND DEVICE

The present application claims priority to Chinese Patent Application No. 202011068929X, filed with the China National Intellectual Property Administration on Sep. 30, 2020, and entitled "CONTENTION-FREE RANDOM ACCESS RESOURCE INDICATION METHOD AND DEVICE", which is incorporated herein by reference in its entirety.

FIELD

The present application relates to the technical field of mobile communication, in particular to a contention-free random access resource indication method and device.

BACKGROUND

In the random access procedure of mobile communication, UE-specific random access configuration information generally is used for contention-free random access. A UE (User Equipment) performs timing advance pre-compensation when transmitting a preamble to the base station in consideration of NTN (Non-Terrestrial Network) communication and similar long-distance communication scenarios. Compensating the timing advance when UE transmits the preamble directly leads to a problem that when the UE receives DCI triggering random access, the time for transmitting the preamble after compensating the timing advance, selecting the first RO (PRACH Occasion, Random Access Occasion) in a first indicated SSB (SS/PBSCH, synchronized block) ID and RO mapping pattern according to DCI (Downlink Control Information) indication, is before the time when UE receives DCI triggering random access, or the time difference between the time when the UE receives DCI triggering random access and the determined time when the preamble is transmitted is inadequate for the UE to prepare preamble transmission for random access.

SUMMARY

The present application provides a contention-free random access resource indication method and device, which solves the problem in an existing method of inadequate preparation time for preamble transmission, and are particularly suitable for a contention-free random access technology of a mobile communication system.

In a first aspect, the present application provides a contention-free random access resource indication method, including the following steps: determining, from a random access triggering time, a time different from the random access triggering time by a first interval as a first time, and selecting an RO to carry a preamble at and after the first time, wherein the first interval is a time offset corresponding to a first time offset, and the random access triggering time is a time when DCI triggers a random access procedure.

Preferably, the method for selecting an RO to carry a preamble further includes: selecting an RO corresponding to PRACH Mask ID in a first available SSB ID and RO association pattern at and after the first time to carry a preamble, wherein SSB ID, PRACH Mask ID and preamble ID are all indicated by the DCI.

Preferably, the method for selecting an RO to carry a preamble further includes: selecting an RO in a first available SSB ID and RO association pattern at and after the first time to carry a preamble, wherein SSB ID and preamble ID are both indicated by the DCI.

Preferably, the method for selecting an RO to carry a preamble further includes: selecting a first available RO corresponding to PRACH Mask ID indicated by the DCI at and after the first time to carry a preamble, wherein PRACH Mask ID and preamble ID are both indicated by the DCI.

Further, the first time offset is indicated in information that is transmitted by a network device to a UE, and/or is indicated in information that is reported by the UE to the network device, and/or has a corresponding relation with a timing advance compensated by the UE itself, and/or has a corresponding relation with a maximum timing advance compensated by UEs within the service range of a cell, and/or is acquired by a device through writing or measurement, and/or is acquired by combination of the above manners. The information transmitted by the network device to UE to indicate the first time offset can be DCI, upper-layer RRC signaling or MAC CE. The reported information from UE to the network device to indicate the first time offset can be carried by PUCCH or PUSCH.

Further, the time unit of a time offset corresponding to the first time offset is millisecond.

Further, the time unit of a time offset corresponding to the first time offset is slot, and the time offset corresponding to the first time offset is:

$$\left\lfloor p \cdot \frac{2^{\mu PRACH}}{2^{\mu PDSCH}} \right\rfloor + K_{offset}$$

wherein $K_{offset}$ is the first time offset, $2^{\mu PRACH}$ is based on uplink subcarrier spacing configuration, $2^{\mu PDSCH}$ is based on downlink subcarrier spacing configuration, and p is a downlink slot at which DCI triggering random access is present.

Preferably, the time offset corresponding to the first time offset is not less than a timing advance applied by the UE to transmit the preamble.

Preferably, the time offset corresponding to the first time offset is not less than the sum of a timing advance applied by the UE to transmit the preamble, and a processing delay.

Preferably, the time offset corresponding to the first time offset is not less than a maximum value of a timing advance applied by UEs to transmit the preamble within the coverage range of a cell.

Preferably, the time offset corresponding to the first time offset is not less than the sum of a maximum value of a timing advance applied by UEs to transmit the preamble within the coverage range of a cell, and a processing delay.

The method according to any embodiment in the first aspect of the present application is applied to a UE device and includes the following steps: acquiring a first time offset, receiving DCI triggering a random access procedure, and selecting an RO corresponding to DCI indication to transmit a preamble after the time offset corresponding to the first time offset.

The method according to any embodiment in the first aspect of the present application is applied to a network device and includes the following steps: acquiring a first time offset, transmitting DCI triggering a random access procedure, and selecting one or a plurality of ROs corresponding to DCI indication to receive and detect a preamble after the time offset corresponding to the first time offset.

In a second aspect, the present application further provides a contention-free random access resource indication UE device, which uses any one of the methods in the first aspect of the present application. The device includes: a UE receiving module, configured to receive DCI; a UE determining module, configured to determine an RO at and after a time offset corresponding to the first time offset over the time when receiving DCI triggers the random access procedure; and a UE transmitting module, configured to transmit a preamble on the determined RO.

In a third aspect, the present application further provides a contention-free random access resource indication network device, which uses any one of methods in the first aspect of the present application. The device includes: a network transmitting module, configured to transmit DCI; a network determining module, configured to determine one or a plurality of ROs at and after a time offset corresponding to a first time offset over the time when transmitting DCI triggering a random access procedure; and a network receiving module, configured to receive and detect a preamble on the determined RO.

The present application further provides a contention-free random access resource indication device, including: a memory, a processor, and a computer program that is stored in the memory and is capable of running on the processor, wherein the computer program, when executed by the processor, implements the steps of the method according to any one of the embodiments in the first aspect of the present application.

The present application further provides a computer-readable medium, wherein the computer-readable medium stores a computer program. The computer program, when executed by a processor, implements the steps of the method according to any one of the embodiments in the first aspect of the present application.

The present application further provides a mobile communication system, including the network device according to any one of the embodiments of the present application, and the UE device according to any one of the embodiments of the present application.

The at least one of the above technical solutions used by the present application can achieve the following beneficial effects:

The method of the present invention can effectively solve the problems that in a long-distance communication scenario, when receiving DCI triggering random access, the time for transmitting the preamble with compensating timing advance, after the UE selects an RO according to DCI indication, is before the time when the UE receives DCI triggering random access, or the time difference between the time when the UE receives DCI triggering random access and the determined time when the preamble is transmitted is inadequate for the UE to prepare preamble transmission for random access.

BRIEF DESCRIPTION OF THE DRAWINGS

The accompanying drawings illustrated herein are provided to further understand the present application and form a part of the present application. The exemplary embodiments of the present application and the descriptions thereof are used to explain the present application and do not constitute an improper limitation on the present application. In the drawings:

FIG. 1(*b*) is a schematic diagram of another contention-free random access according to an embodiment of an existing method;

FIG. 2(*b*) is a schematic diagram of a first selection method of RO according to a method embodiment of the present application;

FIG. 3 is an embodiment of a method applied to a UE device according to the present application;

FIG. 4 is an embodiment of a method applied to a network device according to the present application;

FIG. 5 is a schematic diagram of an embodiment of a UE device;

DETAILED DESCRIPTION OF THE EMBODIMENTS

Figure 1A:
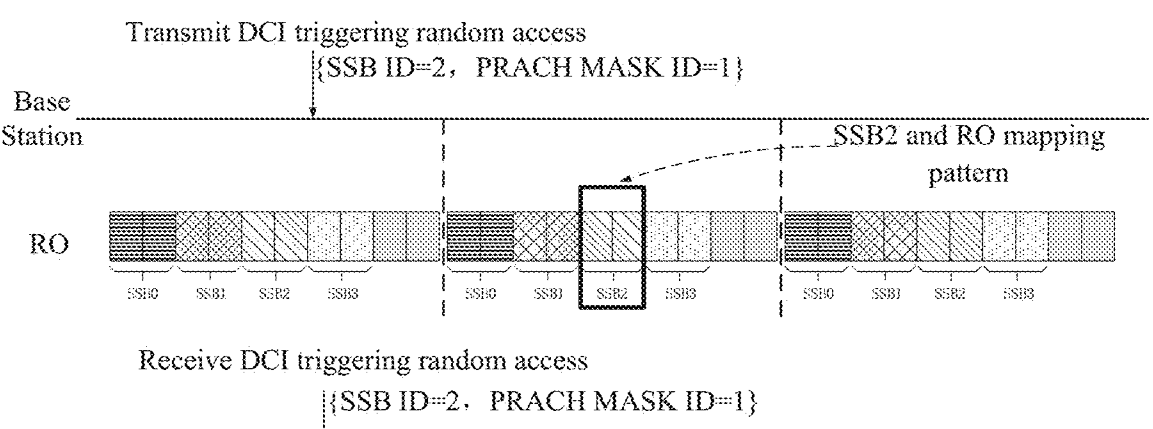
FIG. 1(*a*) is a schematic diagram of a contention-free random access according to an embodiment of an existing method.
Figure 1A:
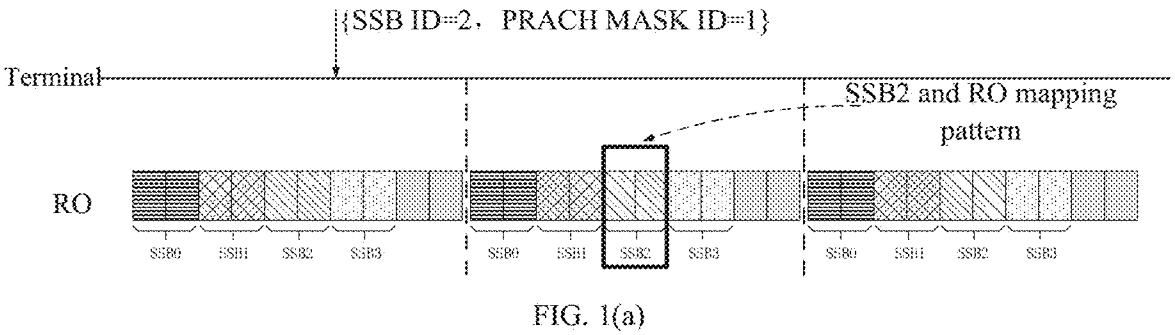
Figure 1B:
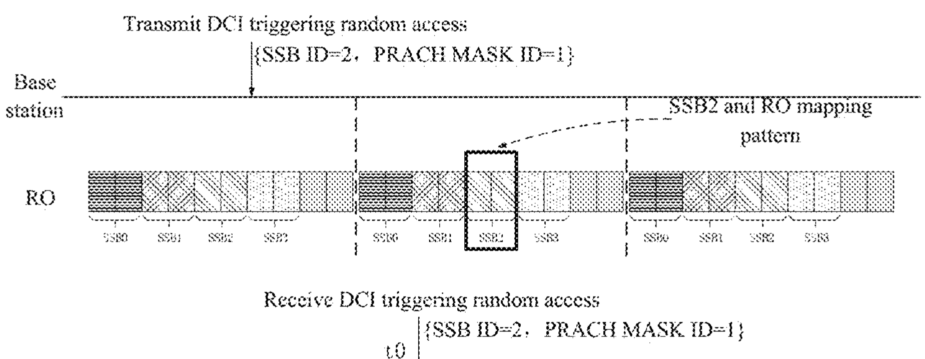
Figure 1B:
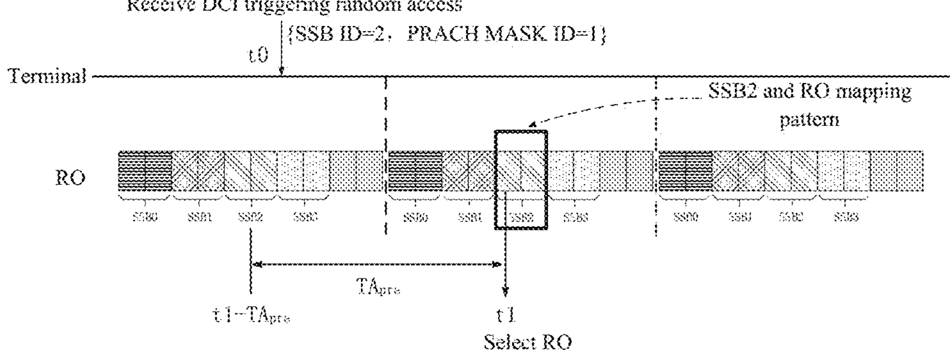

To make the objectives, technical solutions, and advantages of the present application clearer, the technical solutions of the present application will be clearly and completely described below with reference to the specific embodiments of the present application and the corresponding accompanying drawings. Apparently, the described embodiments are merely some rather than all of the embodiments of the present application. All other embodiments obtained by a person of ordinary skill in the art based on the embodiments of the present application without creative efforts shall fall within the protection scope of the present application.

The technical solutions provided in the embodiments of the present application are described in detail with reference to the accompanying drawings.

Embodiment 1

FIG. 1(*a*) is a schematic diagram of a contention-free random access according to an embodiment of an existing method, and FIG. 1(*b*) is a schematic diagram of another contention-free random access according to an embodiment of an existing method.

In a random access procedure of mobile communication, a base station notifies resource configuration information of a RO (PRACH Occasion) for transmitting a preamble to a UE through system information or UE-specific random access configuration information. Generally, the random access resource configuration information carried by the system information is used for contention-based random access. The random access configuration information indicated by the UE-specific random access configuration information is used for contention-free random access.

In a 5G mobile communication system, the RO used by the UE to initiate random access has an association relation with SSB (SS/PBSCH), wherein the association relation between RO and SSB may be in one-to-one mapping, or many-to-one mapping, or one-to-many mapping. The UE may initiate contention-free random access based on a PDCCH (Physical Downlink Control Channel Command, i.e., DCI) transmitted by the base station. The base station indicates preamble ID, SSB (SS/PBSCH) ID and PRACH (Physical Random Access Channel) Mask ID in DCI through which the UE initiates random access. After receiving DCI, the UE selects an RO according to the indicated PRACH Mask ID in a first available indicated SSB ID and RO mapping pattern to transmit the indicated preamble.

For example, as shown in FIG. 1(*a*), the base station indicates SSB ID=2 and PRACH Mask ID=1 in DCI. The DCI transmitted by the base station indicates the UE to employ RO associated with SSB2 to transmit the preamble ID, and correspondingly, the base station receives and detects the preamble at the corresponding RO.

The preamble transmitted by the UE to the base station in the random access procedure is a kind of uplink signal. Generally, to achieve uplink synchronization, that is, to achieve consistency between the time when the uplink signal transmitted by the UE reaches the base station, and the uplink timing of the base station side, the UE needs to apply timing advance when transmitting the uplink signal. A total timing advance $N_{TA,total}$ is expressed as $N_{TA,total}=(N_{TA}+N_{TA,offset})T_c$, wherein a first timing advance $N_{TA}\cdot T_c$ is determined according to a timing advance indicated by the base station in random access response, or a timing advance command with MAC CE (Media Access Control Control Element) received by the UE, and a second timing advance $N_{TA,offset}\cdot T_c$ is a fixed parameter determined according to a duplex mode in which the UE operates and whether LTE-NR are in a coexistence state, wherein $T_c$ is a time unit, the value of 5G NR is 0.509 ns, $N_{TA}$ is a first time unit quantity, and $N_{TA,offset}$ is a second time unit quantity.

Due to the low propagation delay between the base station and the UE in terrestrial communication systems, the UE is in an RRC idle state or an uplink out-of synchronization state or other states when initiating random access, and thus cannot acquire an uplink timing advance indicated by the base station or needs to re-acquire an uplink timing advance indicated by the base station. Therefore, it is agreed that the value of the first timing advance $N_{TA}\cdot T_c$ is set to be 0 when the UE transmits the preamble. The base station detects the preamble transmitted by the UE, measures the timing advance corresponding to the received preamble, and then indicates this information to the UE through random access response.

In a long-distance communication scenario, for example, a non-terrestrial satellite communication scenario, the propagation distance between the UE and the base station may be hundreds or even thousands of kilometers, and the corresponding propagation delay is up to tens to hundreds of milliseconds. If the first timing advance is set to be 0 when the preamble is transmitted, the base station side cannot monitor the preamble. Therefore, the UE performs timing advance pre-compensation when transmitting the preamble in consideration of the NTN (Non-Terrestrial Network) communication and similar long-distance communication scenarios. The pre-compensated timing advance may be twice the propagation delay to the base station estimated by the UE, or may be twice the maximum propagation delay difference estimated by the UE between the UE and a reference point in the coverage range of the base station. Correspondingly, in the NTN and similar long-distance communication scenarios, the pre-compensated timing advance may be several milliseconds to several hundred milliseconds.

Compensating the timing advance when the UE transmits the preamble directly leads to a problem that when the UE receives DCI triggering random access, the time when the preamble is transmitted, after an RO in a first available association pattern with the indicated SSB ID and RO is selected according to DCI indication and the timing advance is compensated, is before the time when the UE receives DCI triggering random access, or the time difference between the time when the UE receives DCI triggering random access and the determined time when the preamble is transmitted is inadequate for the UE to prepare preamble transmission for random access. As shown in FIG. 1(*b*), the base station indicates that the UE employs an RO associated with SSB2 to transmit a preamble in DCI. The UE receives the DCI at a time t0. A time when selecting the RO is t1. The transmitting time after the timing advance is compensated for the selected RO is t1−TApre. A scenario may occur in which the time t1−TApre is less than the time t0, or t1−TApre−t0 is less than a processing delay for the UE after receiving DCI to prepare for preamble transmission.

Embodiment 1 of the present application describes an existing contention-free random access resource indication method and the problem of inadequate preparation time for preamble transmission in the existing method.

Embodiment 2

Figure 2A:
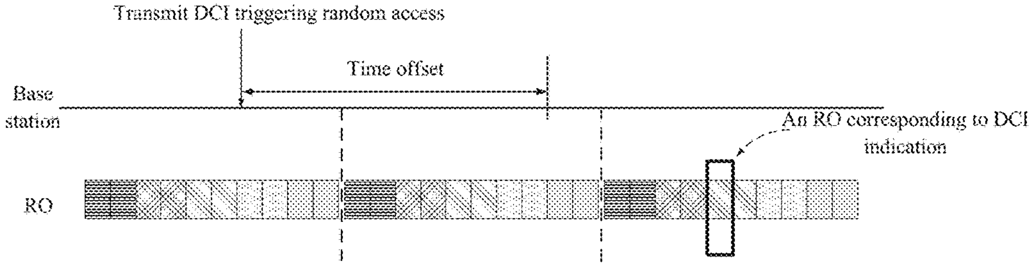
FIG. 2(*a*) is a schematic diagram of DCI indicating RO according to a method embodiment of the present application.
Figure 2B:
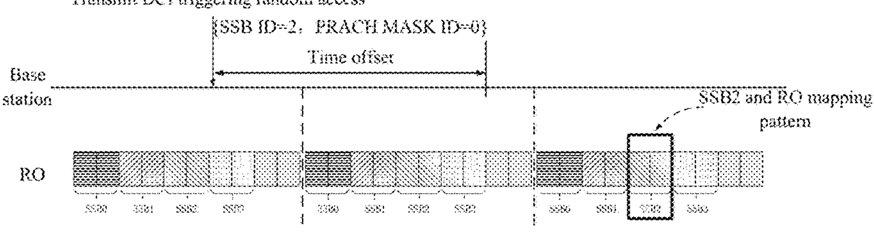
Figure 2B:
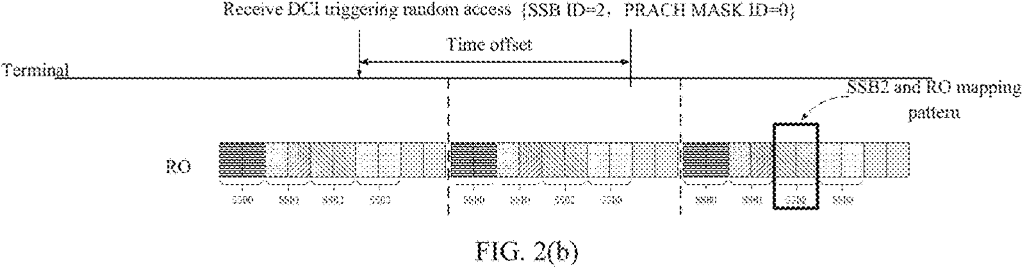

FIG. 2(*a*) is a schematic diagram of DCI indicating RO according to a method embodiment of the present application; and FIG. 2(*b*) is a schematic diagram of a first selection method of RO according to a method embodiment of the present application.

This embodiment provides a contention-free random access resource indication method, which can be applied to a contention-free random access technology of mobile communication and includes the following step 101:

Step 101: starting from a random access triggering time, a time different from the random access triggering time by a first interval is determined as a first time. An RO is selected to carry a preamble at and after the first time.

In step 101, the random access triggering time is a time when DCI triggers a random access procedure. For the base station, the random access triggering time refers to a time when DCI is transmitted, wherein the transmitted DCI is configured to trigger the UE to initiate random access according to DCI indication. For the UE, the random access triggering time refers to a time when DCI is received, wherein the received DCI is configured to trigger UE side to initiate random access.

In step 101, DCI indicates one or several of SSB ID and PRACH Mask ID in addition to preamble ID. A method for selecting an RO at and after the first time includes at least one of the following first selecting method to third selecting method.

FIG. 2(*a*) is a general description of the first selecting method to the third selecting method in which DCI indicates one RO for carrying the preamble. Generally speaking, an RO carrying a preamble corresponds to DCI indication, and the corresponding relation is one or several of the following first selecting method to third selecting method.

The first selecting method: an RO, corresponding to PRACH Mask ID, in a first available SSB ID and RO association pattern at and after a first time is selected.

SSB ID and PRACH Mask ID are both indicated in DCI triggering random access.

The method may be suitable for scenarios where SSB ID and PRACH Mask ID are indicated in DCI.

It should be noted that the available SSB ID and RO association pattern in the present invention is described in Standard 3GPP TS 38.213: "The UE selects for a PRACH transmission the PRACH occasion indicated by PRACH mask index value for the indicated SS/PBCH block index in the first available mapping cycle" (i.e., the UE selects an RO for PRACH transmission, corresponding to PRACH Mask ID, in a first available SSB ID and RO association pattern).

In the first selecting method, the available SSB ID and RO association pattern may be understood as that the SSB ID and RO association pattern is an RO set associated with SSB ID according to resource configuration of PRACH, and RO corresponding to PRACH Mask ID is selected from the set.

For example, assuming that one SSB ID is associated with 8 ROs, the index corresponding to the 8 ROs is 1-8. If the PRACH Mask ID is 6, the RO (RO index=6) in the SSB ID and RO association pattern is selected to carry the preamble. If the PRACH Mask ID corresponds to a plurality of ROs, for example, PRACH Mask ID=0, any one of the plurality of ROs corresponding to PRACH Mask ID or a first RO of the plurality of ROs may be selected. Alternatively, in a random access procedure triggered by PDCCH in an implementation, the scenario where PRACH Mask ID indicated in DCI corresponds to a plurality of ROs can be avoided.

The second selecting method: one of ROs in a first available SSB ID and RO association pattern at and after a first time is selected.

The method may be applied to a scenario where SSB ID is indicated, but PRACH Mask ID is not indicated in DCI, or a scenario where SSB ID is indicated, but indicated PRACH Mask ID is invalid in DCI.

In the second selecting method, any one of ROs associated with SSB ID or a first RO of the plurality of ROs in the first available SSB ID and RO association pattern is selected to carry the preamble.

The third selecting method: a first available RO corresponding to PRACH Mask ID indicated by DCI at and after a first time is selected.

The method may be applied to a scenario where SSB ID is not indicated, but PRACH Mask ID is indicated in DCI. A first available RO corresponding to PRACH Mask ID is selected to carry a preamble. If one PRACH Mask ID corresponds to a plurality of ROs, any RO or a first RO of the plurality of ROs is selected; or in a random access procedure triggered by PDCCH in an implementation, the scenario where PRACH Mask ID indicated in DCI corresponds to a plurality of ROs can be avoided.

In the available RO corresponding to PRACH Mask ID indicated by DCI, "available" is a wording in the standard, which indicates that a valid RO for carrying the preamble can be used according to the acquired configuration information.

In step 101, the first interval is a time offset corresponding to the first time offset.

In step 101, after receiving a PDCCH command (DCI) triggering random access, the UE initiates random access selecting one RO carrying the preamble according to the first selecting method, the second selecting method, and the third selecting method.

In step 101, after transmitting a PDCCH command (DCI) triggering random access of the UE, the base station detects an indicated preamble transmitted by the UE on one or a plurality of ROs according to the first selecting method, the second selecting method, and the third selecting method. Specifically, if RPACH Mask ID indicated in DCI corresponds to a plurality of ROs, or if RPACH Mask ID is invalid in DCI, and SSB ID indicated in DCI corresponds to a plurality of ROs, or if SSB ID is not indicated in DCI, and PRACH Mask ID indicated in DCI corresponds to a plurality of ROs, the UE needs to select any one of the plurality of ROs to transmit the preamble, and as a consequence, the base station side detects the preamble transmitted by the UE on the plurality of corresponding ROs. In other cases, the UE selects one determined RO to transmit the preamble, and correspondingly the base station detects the preamble transmitted by the UE on the one determined RO.

In step 101, an example that preamble ID, SSB (SS/PBSCH) ID and PRACH Mask ID of random access of the UE are indicated in DCI transmitted by the base station is used for further description: when the base station triggers random access through the DCI (PDCCH command), the UE, after receiving the PDCCH command, selects an RO according to the indicated PRACH Mask ID in a first available indicated SSB ID and RO association pattern after the time offset corresponding to the first time offset $K_{offset}$ to transmit the indicated preamble.

For example, as shown in FIG. 2(*b*), the base station transmits DCI triggering random access to the UE. Preamble ID, SSB (SS/PBSCH) ID and PRACH Mask ID for random access of the UE are indicated in DCI. The DCI indicates that SSB ID=2 (that is, an RO resource corresponding to SSB2 is selected to transmit the preamble ID indicated in DCI). After transmitting DCI, the base station may receive and detect the preamble indicated in DCI on the RO corresponding to PRACH Mask ID in the first available SSB2 and RO association pattern after the time offset corresponding to the first time offset $K_{offset}$.

Correspondingly, after receiving the DCI, the UE selects one RO corresponding to PRACH Mask ID in the first available SSB2 and RO association pattern to transmit the preamble indicated in DCI after the time offset corresponding to the first time offset $K_{offset}$.

Preferably, the first time offset is indicated in information that is transmitted by a network device to a UE, and/or is indicated in information that is reported by the UE to the network device, and/or has a corresponding relation with a timing advance compensated by the UE itself, and/or has a corresponding relation with a maximum timing advance compensated by UEs within the service range of a cell, and/or is acquired by a device through writing or measurement, and/or is acquired by combination of the above manners. Information transmitted by the network device to the UE may be DCI, upper-layer RRC signaling or MAC CE; and information reported by the UE to the network device may be information carried by PUCCH or PUSCH. The DCI may be or not be DCI triggering random access. The acquisition by the device through writing or measurement may be a manner of writing a fixed parameter or the like which does not need to be indicated by additional network device signaling according to a protocol agreement. The timing advance compensated by the UE has a certain corresponding relation with the propagation delay between the UE and the base station. The maximum timing advance compensated by UEs in the service range of the cell has a certain corresponding relation with the maximum propagation delay between UE and the base station in the service range of the cell.

It should be further noted that the manner that the first time offset is acquired by superposing the parameter acquired based on the above manners with one or a plurality of known parameters is equivalent to the manner that the first offset is acquired based on the above manners. The manner that the first time offset is determined by the UE according to a candidate parameter index indicated in the above DCI, RRC signaling or MAC CE, from a table of candidate first time offsets agreed in the standard is equivalent to the manner that the first time offset is acquired based on the above manners. The manner that the first time offset is determined by superposing a parameter determined by the UE according to a candidate parameter index indicated in the above DCI, RRC signaling or MAC CE, from a table of candidate parameters agreed in the standard with one or a plurality of known parameters is equivalent to the manner that the first time offset is acquired based on the above manner. Generally speaking, the manner that the first time offset is determined by superposing partial information of the first time offset acquired based on the above manner with one or a plurality of known parameters is equivalent to the manner that the first time offset is acquired based on the above manners.

Preferably, the time unit of the time offset corresponding to the first time offset is millisecond, that is, the time offset corresponding to the first time offset $K_{offset}$ is $K_{offset}$ milliseconds, which shows that after receiving DCI triggering random access and waiting for $K_{offset}$ milliseconds, the UE selects an RO to transmit the preamble indicated by DCI. Correspondingly, after transmitting DCI triggering random access and waiting for $K_{offset}$ milliseconds, the base station selects the RO corresponding to indication to receive and detect the preamble indicated by the DCI.

Preferably, the time unit of the time offset corresponding to the first time offset is slot, and the time offset corresponding to the first time offset is:

$$\left\lfloor p \cdot \frac{2^{\mu PRACH}}{2^{\mu PDSCH}} \right\rfloor + K_{offset},$$

wherein $K_{offset}$ is the first time offset, $2^{\mu PRACH}$ is based on uplink subcarrier spacing configuration, $2^{\mu PDSCH}$ is based on downlink subcarrier spacing configuration, and p is a downlink slot at which the DCI triggering random access is present.

For the UE side, it means that after receiving DCI triggering random access, the UE selects an RO after the uplink slot $$\left\lfloor p \cdot \frac{2^{\mu PRACH}}{2^{\mu PDSCH}} \right\rfloor + K_{offset}$$

to transmit the preamble indicated by DCI, p represents the downlink slot when the UE receives the DCI triggering random access, $$\left\lfloor p \cdot \frac{2^{\mu PRACH}}{2^{\mu PDSCH}} \right\rfloor + K_{offset}$$

is based on an uplink subcarrier spacing configuration, wherein n=1, 2, 3 . . . .

Correspondingly, for the base station side, it means that after transmitting the DCI triggering the random access, the base station receives and detects the preamble indicated by DCI on the RO corresponding to DCI after the uplink slot $$\left\lfloor p \cdot \frac{2^{\mu PRACH}}{2^{\mu PDSCH}} \right\rfloor + K_{offset},$$

wherein the slot p represents the downlink slot at which the DCI triggering random access, which is transmitted by the base station, is present.

Preferably, the time offset corresponding to the first time offset $K_{offset}$ is required to be not less than a timing advance $TA_{pre,UE}$ applied by the UE to transmit the preamble.

Preferably, the time offset corresponding to the first time offset is required to be not less than the sum of a timing advance $TA_{pre,UE}$ applied by the UE to transmit the preamble, and a processing delay $N_{pro}$, wherein $N_{pro}$ represents the processing delay used by the UE to receive DCI triggering random access and to prepare to transmit random access information.

Preferably, the time offset corresponding the first time offset $K_{offset}$ is required to be not less than a maximum value $TA_{pre,max}$ of a timing advance applied by UEs to transmit the preamble within the coverage range of a cell.

Preferably, the time offset corresponding to the first time offset is required to be not less than the sum of a maximum value $TA_{pre,max}$ of a timing advance applied by UEs to transmit the preamble within the coverage range of a cell, and a processing delay $N_{pro1}$, wherein $N_{pro1}$ represents the processing delay used by the UE to receive DCI triggering random access and to prepare to transmit random access information.

It should be further noted that the time when the RO is selected by the UE may be different from the actual transmission time when the UE transmits the preamble using the RO. The actual transmission time when the preamble is transmitted using the RO is a time after the timing advance is applied at the time when the RO is selected, wherein the applied timing advance may be 0, or the second timing advance, or the sum of the second timing advance and the pre-compensated timing advance of the UE side. The time when the RO is selected by the base station may be different from the actual detection time when the base station receives and detects the preamble transmitted by the UE using the RO. The actual detection time when receiving and detecting the preamble transmitted by the UE using the RO may be a time when the RO is selected by the base station, or may be a time after a common timing advance is compensated to the time when the RO is selected by the base station.

For example, assuming that in a communication scenario, the base station sets a reference position in a serving cell, and uplink data is transmitted at the reference position, so that the timing advance required for alignment with uplink timing of the base station is a C-TA (Common Timing Advance). The timing advance applied by the UE to transmit the uplink data is based on a D-TA (Differential Timing Advance) compared with the common timing advance. The D-TA is a difference between a F-TA (Full Timing Advance) required by the UE to transmit uplink data to achieve alignment with the uplink timing of the base station, and the common timing advance. At this time, the base station needs to compensate a common timing advance with reference to uplink timing of the present side when detecting the UE transmitting the preamble.

The present application provides a contention-free random access resource indication method to solve the problem that when the UE receives DCI triggering random access, a time when the preamble is transmitted, after one RO is selected according to DCI indication and the timing advance is compensated, is before the time when the UE receives DCI triggering random access, or the time difference between the time when the UE receives DCI triggering random access and the determined time when the preamble is transmitted is inadequate for the UE to prepare preamble transmission for random access.

Embodiment 3

FIG. 3 is an embodiment of a method for a UE device according to the present application.

The method according to any one of the embodiments in the first aspect of the present application is applied to a UE device and includes the following steps 201-202.

Step 201: a first time offset is acquired.

In step 201, the first time offset may be acquired by the UE from information transmitted by a network device to the UE, and/or may correspond to the first time offset indicated in the information reported by the UE to the base station, and/or may have a corresponding relation with the timing advance compensated by the UE itself, and/or may have a corresponding relation with the maximum timing advance compensated by UEs in the service range of the cell, and/or may be acquired by the UE device through writing or measurement, and/or may be acquired in a manner of combining the above manners. The information transmitted by the network device to the UE may be DCI, upper-layer RRC signaling or MAC CE, and the information reported by the UE to the network device may be information carried by PUCCH or PUSCH. DCI may be or may not be DCI triggering random access.

As described in step 101, the manner that the first time offset is determined by superposing partial information of the first time offset acquired based on the above manner with one or a plurality of known parameters is equivalent to the manner that the first time offset is acquired based on the above manner.

Step 202: DCI triggering a random access procedure is received, and an RO is selected to transmit a preamble after the time offset corresponding to the first time offset superposed at the time when DCI is received.

In step 202, the UE receives DCI transmitted by the base station, the DCI triggers the random access procedure, and the time when the UE receives the DCI is a random access triggering time of the UE side.

In step 202, the method of selecting an RO by the UE has been described in detail in Embodiment 2, which will not be repeated here.

In step 202, the process of transmitting the preamble by the UE has been described in detail in Embodiment 2, which will not be elaborated herein.

Embodiment 4

FIG. 4 is an embodiment of a method for a network device according to the present application.

The method according to any one of the embodiments in the first aspect of the present application is applied to a network device and includes the following steps 301-302.

Step 301: a first time offset is acquired.

In step 301, the first time offset acquired by the network device corresponds to a first time offset in the information transmitted by the network device to the UE, and/or corresponds to a first time offset indicated in the information reported by the UE to the network device, and/or has a corresponding relation with the timing advance compensated by the UE itself and reported by the UE, and/or has a corresponding relation with the maximum timing advance compensated by UEs in the service range of the cell, and/or is acquired in a manner of writing or measurement by the network device side, and/or is acquired in a manner of combining the above manners. Information transmitted by the network device to the UE may be DCI, upper-layer RRC signaling or MAC CE; and information reported by the UE to the network device may be information carried by PUCCH or PUSCH. The DCI may be or may not be DCI triggering random access.

As described in step 101, the manner that the first time offset is determined by superposing partial information of the first time offset acquired based on the above manners with one or a plurality of known parameters is equivalent to the manner that the first time offset is acquired based on the above manner.

Step 302: DCI triggering a random access procedure is transmitted, and an RO corresponding to the indication is selected to receive and detect a preamble after the time offset corresponding to the first time offset superposed at the time when DCI is received.

In step 302, the method in which the base station transmits DCI triggering the random access procedure, and the method that the base station receives and detects the preamble ID has been described in detail in Embodiment 2, which will not be repeated here.

Embodiment 5

FIG. 5 is a schematic diagram of an embodiment of a UE device.

The present application further provides a UE device using the method according to any one of the embodiments in the present application. The UE device is applied to a contention-free random access procedure.

To implement the above technical solution, the present application provides a UE device 500, including: a UE receiving module 501, a UE determining module 502, and a UE transmitting module 503.

The UE receiving module is configured to receive DCI.

The UE determining module is configured to determine an RO at and after a time offset corresponding to a first time offset superposed at a time when DCI triggers a random access procedure.

The UE transmitting module is configured to transmit a preamble on the determined RO.

The specific methods for achieving the functions of the UE receiving module, the UE determining module and the UE transmitting module are described as the respective method embodiments of the present application, which will not be repeated here.

The UE according to the present application may refer to a mobile UE device.

Embodiment 6

Figures 6, 7:
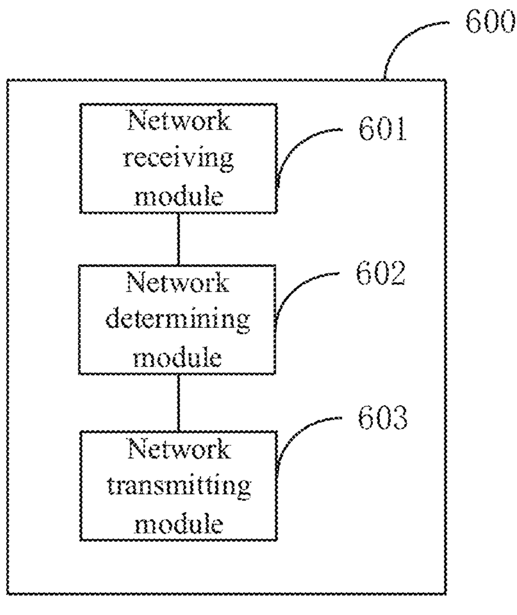
FIG. 6 is a schematic diagram of an embodiment of a network device.
FIG. 7 is a structural schematic diagram of a network device according to another embodiment of the present application.

FIG. 6 is a schematic diagram of an embodiment of a network device.

An embodiments of the present application further provides a network device, using the method according to any one embodiments of the present application.

To implement the above technical solution, the present application provides a network device 600, including: a network receiving module 601, a network determining module 602, and a network transmitting module 603.

The network transmitting module is configured to transmit DCI.

The network determining module is configured to determine an RO corresponding to indication at and after a time offset corresponding to a first time offset superposed at a time when DCI is transmitted.

The network receiving module is configured to receive and detect a preamble ID on the determined RO.

The specific methods for achieving the functions of the network transmitting module, the network receiving module and the network determining module are as described in the respective method embodiments of the present application, which will not be repeated here.

Embodiment 7

FIG. 7 is a structural schematic diagram of a network device according to another embodiment of the present application. As shown in the figure, a network device 700 includes a processor 701, a wireless interface 702, and a memory 703. The wireless interface may be a plurality of assemblies, which includes a transmitter and a receiver, and provides units configured to communicate with various other apparatuses on a transmission medium. The wireless interface achieves the function of communicating with the UE device, a wireless signal is processed by receiving and transmitting apparatuses, and data carried by the signal communicate with the memory or processor through an internal bus structure. The memory 703 includes a computer program for implementing any one of the embodiments of the present application, and the computer program runs or changes on the processor 701. The memory, processor and wireless interface circuits are connected through a bus system. The bus system includes a data bus, a power supply bus, a control bus, and a status signal bus, which will not be elaborated herein.

Embodiment 8

Figure 8:
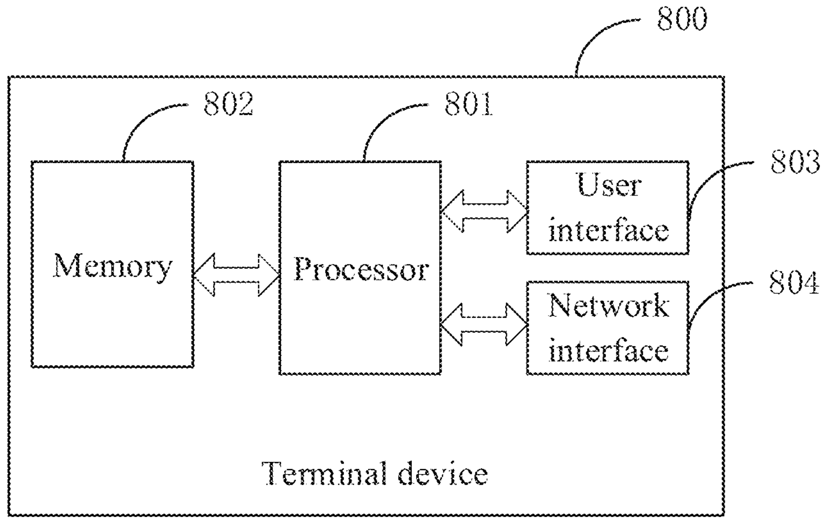
FIG. 8 is a block diagram of a UE device according to still another embodiment of the present application.

FIG. 8 is a block diagram of a UE device according to another embodiment of the present application. A UE device 800 includes at least one processor 801, a memory 802, a user interface 803 and at least one network interface 804. The assemblies in the UE device 800 are coupled together through a bus system. The bus system is configured to implement connection communication between these assemblies. The bus system includes a data bus, a power supply bus, a control bus, and a status signal bus.

The user interface 803 may include a display, a keyboard, or a clicking device, for example, a mouse, a trackball, a touch panel, or a touchscreen, etc.

The memory 802 stores an executable module or a data structure. The memory may store an operating system and an application program therein. The operating system includes various system programs, such as a framework layer, a core library layer, and a driver layer, and is configured to implement various basic services and process hardware-based tasks. The application program includes various application programs, for example, a media player, and a browser, etc., and is configured to implement various application services.

In the embodiments of the present application, the memory 802 includes a computer program for implementing any one of the embodiments of the present application, and the computer program runs or changes on the processor 801.

The memory 802 includes a computer-readable storage medium, and the processor 801 reads information from the memory 802, and implements the steps of the foregoing methods in combination with its hardware. Specifically, the computer-readable storage medium stores a computer program thereon, and the computer program, when executed by the processor 801, implements the steps of the foregoing method embodiment according to any one of the above embodiments.

The processor 801 may be an integrated circuit chip, and has a signal processing capability. During implementation, the steps of the method according to the present application can be implemented by hardware integrated logic circuits in the processor 801 or instructions in the form of software. The processor 801 may be a general-purpose processor, a digital signal processor, an application-specific integrated circuit, a field programmable gate array or another programmable logic device, a discrete gate or a transistor logic device, or a discrete hardware assembly. The methods, steps, and logic block diagrams disclosed in the embodiments of the present application may be implemented or executed. The general-purpose processor may be a microprocessor, or the processor may be any conventional processor or the like. The steps of the methods disclosed with reference to the embodiments of the present application may be directly performed by a hardware decoding processor, or may be performed by using the combination of hardware and software modules in a decoding processor.

The specific mobile communication technologies described in the present application, without limitation, may be WCDMA, CDMA2000, TD-SCDMA, WiMAX, LTE/LTE-A, LAA, MuLTEfire, and the subsequent 5th-generation, 6th-generation, Nth-generation mobile communication technologies.

The UE described in the present application refers to a UE side product capable of supporting a communication protocol of a terrestrial communication system. A modem module (wireless modem) special for communication can be integrated by various types of UEs such as a mobile phone, a tablet computer, and a data card.

For the convenience of description, the 4th-generation mobile communication system LTE/LTE-A and MulteFire derived therefrom are taken as examples, wherein the mobile communication UE is represented as user equipment, and an access device is represented as a base station or an AP (Access Point).

It should further be noted that the present application may be extended as a scenario where after receiving DCI triggering random access, the UE selects a plurality of ROs after the time offset corresponding to the first time offset to transmit preambles for multiple times, and correspondingly, after transmitting DCI triggering random access, and the base station detects the preambles on the plurality of corresponding ROs after the time offset corresponding to the first time offset. The extended scenario is within the spirit and principle of the present application.

It should also be noted that the term "comprise", "include", or any other variant thereof is intended to cover a non-exclusive inclusion, such that a process, method, product, or device that includes a series of elements includes not only those elements, but also other elements not explicitly listed, or elements that are inherent to such a process, method, product, or device. An element defined by a phrase "including a/an . . . " does not exclude presence of other identical elements in the process, method, commodity, or device that includes the element without further limitations.

It should also be noted that "first" and "second" in the present application are used to distinguish a plurality of objects with the same name, and have no other special meanings unless otherwise specified.

The above description is only embodiments of the present application and is not intended to limit the present application. For those skilled in the art, the present application may have various modifications and changes. Any modifications, equivalent substitutions, improvements, etc., made within the spirit and principle of the present application should be included within the scope of the claims of the present application.

What is claimed is:

1. A contention-free random access resource indication method, characterized by, suitable for scenario where a User Equipment (UE) performs timing advance pre-compensation when transmitting a preamble in a contention-free random access, comprising the following steps:

determining, from a random access triggering time, a time different from the random access triggering time by a first interval as a first time, and selecting a random access occasion (RO) to carry the preamble at and after the first time, wherein the first interval is a time offset corresponding to a first time offset, and the random access triggering time is a time when Downlink Control Information (DCI) triggers a random access procedure, the time offset corresponding to the first time offset is not less than a maximum value of a timing advance applied by UEs to transmit the preamble within the coverage range of a cell;

wherein the method for selecting an RO to carry a preamble further comprises:

selecting an RO corresponding to Physical Random Access Channel (PRACH) Mask ID in a first available Synchronization Signal Block (SSB) ID and RO association pattern at and after the first time to carry a preamble, wherein SSB ID, PRACH Mask ID and preamble ID are all indicated by the DCI;

or, selecting a first available RO corresponding to PRACH Mask ID indicated by DCI at and after the first time to carry a preamble, wherein PRACH Mask ID and preamble ID are both indicated by the DCI.

2. The contention-free random access resource indication method according to claim 1, characterized in that the first time offset is obtained in any one of the following ways:

indicated in information that is transmitted by a network device to a UE;

indicated in information that is reported by the UE to the network device;

a corresponding relation with a timing advance compensated by the UE itself;

a corresponding relation with a maximum timing advance compensated by UEs within the service range of a cell;

acquired by a device through writing or measurement;

the information is DCI, upper-layer Radio Resource Control (RRC) signaling or Medium Access Control Control Element (MAC CE) under the condition that the first time offset is indicated in the information that is transmitted by the network device to the UE; and the reported information is information carried by Physical Uplink Control Channel (PUCCH) or Physical Uplink Shared Channel (PUSCH) under the condition that the first time offset is indicated in the information that is reported by the UE to the network device.

3. The contention-free random access resource indication method according to claim 1, characterized in that a time unit of a time offset corresponding to the first time offset is millisecond.

4. The contention-free random access resource indication method according to claim 1, characterized in that a time unit of a time offset corresponding to the first time offset is slot, and the time offset corresponding to the first time offset is:

$$\left\lfloor p \cdot \frac{2^{\mu PRACH}}{2^{\mu PDSCH}} \right\rfloor + K_{offset}$$

wherein $K_{offast}$ is the first time offset, $2^{\mu PRACH}$ is based on uplink subcarrier spacing configuration, $2^{\mu PDSCH}$ is based on downlink subcarrier spacing configuration, and p is a downlink slot at which DCI triggering random access is present.

5. The contention-free random access resource indication method according to claim 1, characterized in that the time offset corresponding to the first time offset is not less than a timing advance applied by the UE to transmit the preamble.

6. The contention-free random access resource indication method according to claim 1, characterized in that the time offset corresponding to the first time offset is not less than the sum of a timing advance applied by the UE to transmit the preamble, and a processing delay.

7. The contention-free random access resource indication method according to claim 1, characterized in that the time offset corresponding to the first time offset is not less than the sum of a maximum value of a timing advance applied by UEs to transmit the preamble within the coverage range of the cell, and a processing delay.

8. The method according to claim 1, applied to a UE device and characterized by comprising the following steps:

acquiring the first time offset; and receiving DCI triggering a random access procedure, and selecting an RO corresponding to DCI indication to transmit the preamble at and after the time offset corresponding to the first time offset superposed at the time when DCI is received.

9. The method according to claim 1, characterized by being applied to a network device and comprising the following steps:

acquiring the first time offset; and transmitting DCI triggering a random access procedure, and selecting one or a plurality of ROs corresponding to DCI indication to receive and detect the preamble at and after the time offset corresponding to the first time offset superposed at the time when DCI is transmitted.

10. A contention-free random access resource indication UE device, configured to implement the method according to claim 1, and characterized by comprising:

a UE receiving module, configured to receive DCI;

a UE determining module, configured to determine an RO corresponding to DCI indication at and after a time offset corresponding to a first time offset superposed at a time when DCI triggers a random access procedure; and a UE transmitting module, configured to transmit a preamble on the determined RO.

11. A contention-free random access resource indication network device, configured to implement the method according to claim 1, and characterized by comprising:

a network transmitting module, configured to transmit DCI;

a network determining module, configured to determine one or a plurality of ROs corresponding to DCI indication at and after a time offset corresponding to a first time offset superposed at a time when DCI is transmitted; and a network receiving module, configured to receive and detect a preamble at a determined RO.

12. A contention-free random access resource indication device, characterized by comprising: a memory, a processor, and a computer program that is stored in the memory and is capable of running on the processor, wherein the computer program, when executed by the processor, implements the steps of the method according to claim 1.

13. A non-transitory computer-readable medium, characterized in that the computer-readable medium stores a computer program; the computer program, when executed by a processor, implements the steps of the method according to claim 1.

14. A mobile communication system, characterized by comprising at least one UE device according to claim 10 and at least one network device.

15. A mobile communication system, characterized by comprising at least one UE device and at least one network device according to claim 11.

* * * * *